United States Patent [19]
Shrinkle

[11] Patent Number: 5,930,072
[45] Date of Patent: Jul. 27, 1999

[54] HEAD-DISK ASSEMBLY FOR REDUCING NOISE COUPLED INTO MAGNETORESISTIVE HEAD PREAMPLIFIERS

[75] Inventor: Louis J. Shrinkle, Leucadia, Calif.

[73] Assignee: Seagate Technology, Inc., Longmont, Calif.

[21] Appl. No.: 08/851,682

[22] Filed: May 6, 1997

[51] Int. Cl.$^6$ .......................... G11B 5/012; G11B 17/00
[52] U.S. Cl. ........................................ 360/97.01; 360/104
[58] Field of Search .............................. 360/69, 104, 106, 360/97.01, 97.02

[56] References Cited

U.S. PATENT DOCUMENTS

| | | | |
|---|---|---|---|
| 5,482,898 | 1/1996 | Marrs | 437/216 |
| 5,583,727 | 12/1996 | Parkin | 360/113 |
| 5,656,877 | 8/1997 | Loubier | 360/104 |
| 5,699,211 | 12/1997 | Magnusson | 360/104 |
| 5,708,541 | 1/1998 | Erpelding | 360/104 |

*Primary Examiner*—A. J. Heinz
*Attorney, Agent, or Firm*—Fliesler, Dubb, Meyer & Lovejoy, LLP

[57] ABSTRACT

A head-disk assembly contains an actuator that includes magnetoresistive heads and a preamplifier. The preamplifier is grounded to the actuator, and the actuator is grounded to a baseplate head-disk assembly via a ground conductor. A first inductive loop, which results in noise coupling on the pre-amplifier, exists based on the unequal potential between the actuator and the baseplate. The length of the ground conductor is minimized to reduce the area of the first inductive loop. A second inductive loop arises from a conductive path from the pre-amplifier leads to the baseplate via the actuator suspension, slider body assembly, magnetoresistive head, and magnetic disk media. A reduction of the unequal potential, which results in the second inductive loop, reduces noise coupling onto the inputs of the pre-amplifier. Conditioning of power, signal and control traces are also disclosed.

20 Claims, 7 Drawing Sheets

ARM/FLEX LAYOUT

HEAD-DISK ASSEMBLY FOR REDUCING NOISE COUPLED INTO MAGNETORESISTIVE HEAD PREAMPLIFIERS

BACKGROUND OF THE INVENTION

1. Field of the Invention

The present invention is directed toward the field of hard disk drives, and more particularly to reducing noise coupling into head-disk assemblies.

2. Art Background

One objective in designing hard disk drive storage devices is to achieve high capacity for data storage (i.e., maximizing the amount of data stored on a given amount of disk space). Storing data in a high capacity on a hard disk drive requires high-linear densities on the magnetic media, which in turn requires high recording data rates. Magnetoresistive heads, which include low inductance read and write elements, are utilized in hard disk drives to achieve high data rates. The high data rates used to achieve high recording densities also require the use of higher digital clocking rates in the control circuit of the hard disk drive. These high recording densities result in broader read channel bandwidths to read data from the magnetic media (i.e., the faster the data rate the larger the read channel bandwidth). To accommodate fast control circuit clock rates, the clock rise and fall times are minimized. Because of these factors, electromagnetic noise spectrums from the control circuit have become more broadband and more energy.

The electromagnetic noise from the control circuit can be within the large read channel bandwidth, and thus interferes with the read channel. Typically, the signal voltage levels output from the magnetoresistive heads are very small (e.g., in the hundreds of micro volts range). A head preamplifier is typically used to amplify the small output voltage levels generated from the magnetoresistive heads. The rich electromagnetic noise spectrum generated from the control circuits is easily coupled into the input stage of the head preamplifier, particularly when the head preamplifier operates to amplify data in a broad read channel bandwidth.

One prior art technique to remove electromagnetic noise involves limiting the channel bandwidth so that the frequency of most of the undesirable noise is not within the channel bandwidth. However, as discussed above, to achieve high recording densities, and consequently high storage capacities, a broader channel bandwidth is required. Therefore, reducing the channel bandwidth is an unacceptable alternative for high density hard disk drive devices. Thus, it is desirable to reduce electromagnetic noise coupled into the input stage of a head preamplifier to maximize read signal quality and overall system performance of the hard disk drive.

FIG. 1a is a top view of a prior art head-disk assembly, and FIG. 1b is a side view of a prior art head-disk assembly. An arm or actuator 120 includes magnetoresistive heads 125 that readwrite data on magnetic disk media 110. A preamplifier 130 is mounted on the actuator 120 in close proximity to the heads 125 in an attempt to reduce noise coupling at the preamplifier 130. Typically, the preamplifier 130 is grounded to the metal of the actuator 120 through a grounding screw 132. A control circuit, typically mounted on a printed circuit board (PCB) 140, is coupled to the actuator 120 via conductors 135. One of the conductors 135 is a ground connection, and the ground connection is further electrically coupled to the metal of the hard disk drive device (e.g., the base plate). Conductors 135 electrically couple the printed circuit board (PCB) 140 to the preamplifier 130 on the actuator 120. The head-disk assembly 100 configuration shown in FIG. 1a and 1b results in the coupling of noise onto the leads of the preamplifier 130 primarily through the conductors 135. For high recording density applications, this noise coupling is introduced into the read channel, thereby degrading hard disk drive performance, and inhibiting the ability to achieve high storage capacities.

As is described fully below, the present invention provides a uniform method and apparatus for noise reduction based on a complete understanding of the noise coupling mechanisms in a head-disk assembly.

SUMMARY OF THE INVENTION

A head-disk assembly is configured to reduce noise, thereby permitting recording at high data rates to achieve high storage densities. A head-disk assembly includes an actuator that has a magnetoresistive head and a flex circuit. A pre-amplifier, which amplifies data signals from the magnetoresistive head, is mounted on the actuator. The actuator is housed in a head disk assembly to help shield the magnetoresistive head and pre-amplifier from stray electromagnetic fields. The head-disk assembly metal provides a ground for the actuator. The ground on the pre-amplifier is coupled to the actuator metal, and the actuator metal is coupled to the head-disk assembly metal via a ground conductor. However, a first inductive loop exists in the ground lead from the actuator arm screw to the head disk assembly metal. The first inductive loop area is minimized to reduce high frequency noise coupling onto the input leads of the pre-amplifier. In one embodiment, to reduce the first inductive loop area, the length of the ground conductor, which couples the actuator metal to the head-disk assembly metal, is only long enough to permit full motion of the actuator.

The actuator further includes a suspension and a slider body assembly for mounting the magnetoresistive head in close proximity to the magnetic media of the disk drive. The magnetic disk media, having a conductive substrate, is mounted on a disk bearing assembly. The disk bearing assembly is grounded on the head-disk assembly metal. A second inductive loop arises from a conductive path that includes, the suspension arm, the slider body assembly, the magnetoresistive head, the magnetic disk media, and the head-disk assembly metal.

Although there is a physical gap between the head and the disk media, the second inductive loop is closed due to the high capacitive coupling between the head and the disk media. Noise creates an unequal potential throughout the inductive loop.

A reduction of the unequal potential, which results in the second inductive loop, reduces noise coupling onto the inputs of the pre-amplifier.

The control circuit generates control signals and power for the pre-amplifier. The control circuit is grounded on the head-disk assembly metal. In one embodiment, the power, signal and control traces are coupled from the control circuit independent of the ground conductor (e.g., the ground conductor is directly coupled to the head-disk assembly metal). Also, the power, signal and control traces are conditioned to minimize noise coupling from the control circuit to the actuator.

DETAILED DESCRIPTION OF THE PREFERRED EMBODIMENTS

Figure 2:
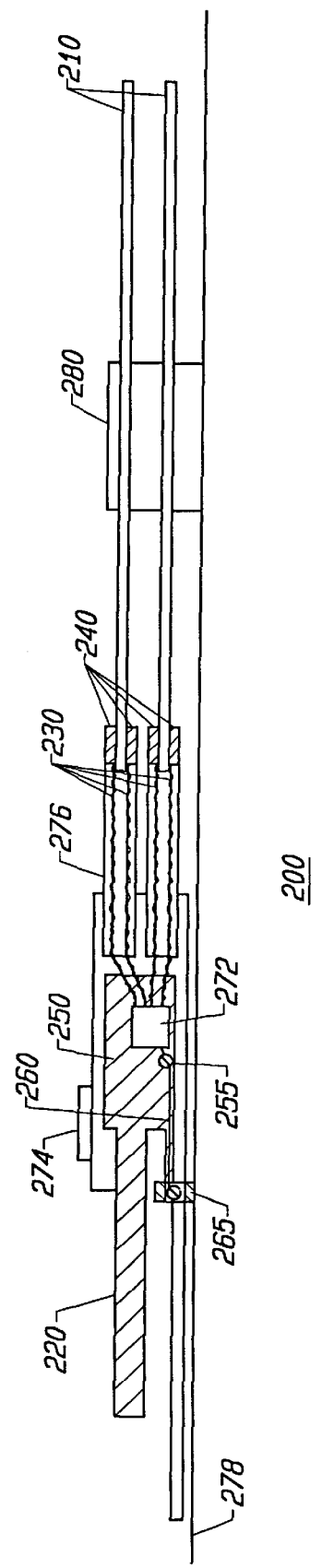
FIG. 2 is a side view of a head-disk assembly configured in accordance with one embodiment of the present invention.

FIG. 2 is a side view of a head-disk assembly configured in accordance with one embodiment of the present invention. Generally, the head-disk assembly 200 consists of magnetic disk media 210 and an arm or actuator 220. In one embodiment, the head-disk assembly 200 includes a low inductance readwrite head element, such as a magnetoresistive head (not shown) housed in a slider body assembly 240 on the actuator 220. Although the present invention is described in conjunction with a magnetoresistive head, a standard inductive head may be used without deviating from the spirit or scope of the invention.

Figure 3:
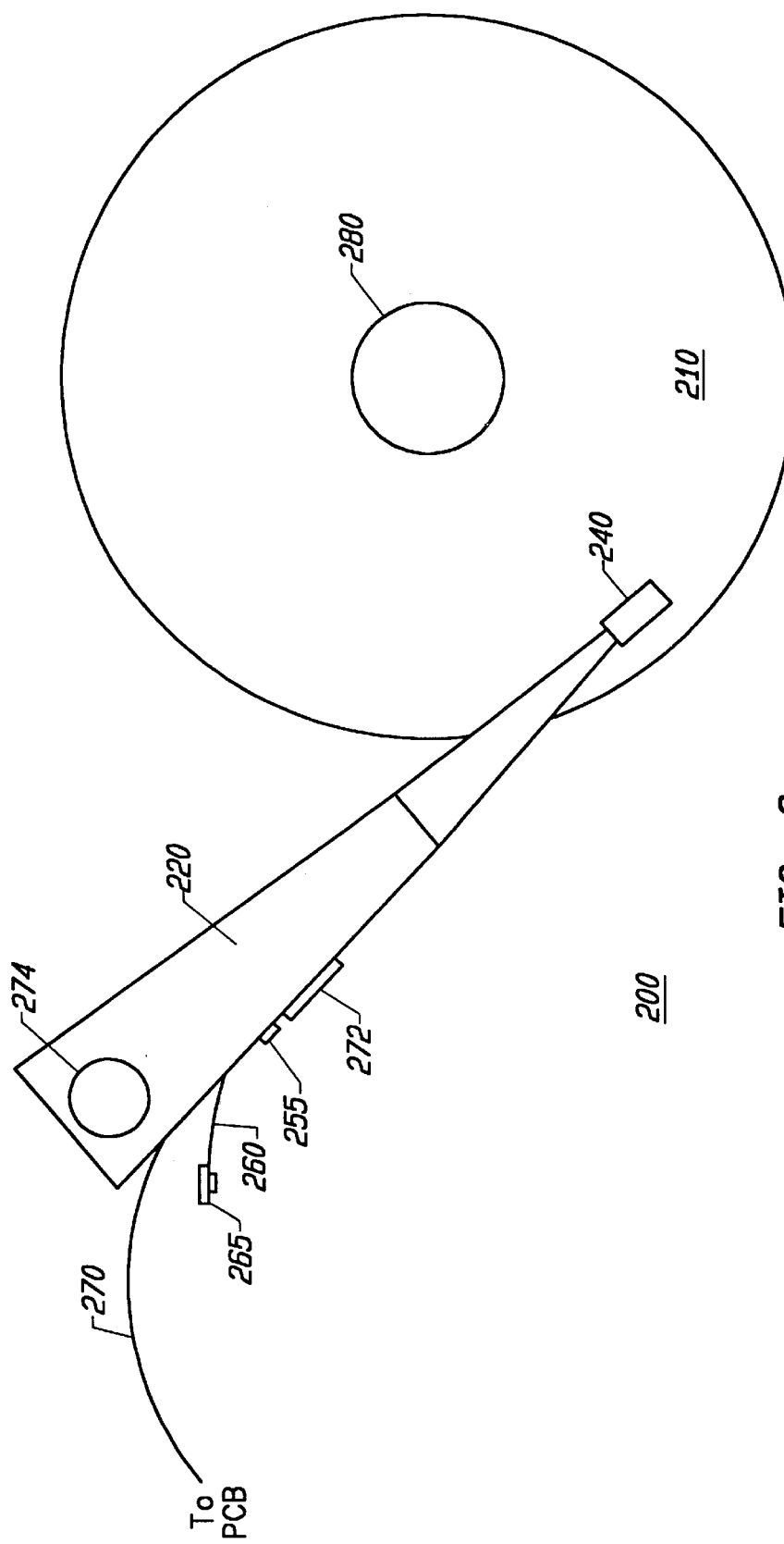
FIG. 3 illustrates a top view of a head-disk assembly configured in accordance with one embodiment of the present invention.

FIG. 3 illustrates a top view of the head-disk assembly 200 shown in FIG. 2. For this embodiment, the head-disk assembly contains a plurality of magnetic disk media 210. A disk bearing assembly 280 operates to spin the magnetic media for readwrite operations as is well known in the art of hard disk drive devices. The actuator 220 is positioned to readwrite different tracks of the magnetic disk media 210 as is also well known in the art of hard disk drive devices. The positioning of the actuator 220 is accomplished through an arm bearing assembly 274.

A preamplifier 272, and associated circuitry (not shown), is mounted on a flex circuit 250. Each magnetoresistive head, located within each slider body assembly 240, is electrically coupled to the preamplifier 272 via head signal conductors 230. In one embodiment, the head signal conductors 230 are twisted pair wires that couple a differential output of magnetoresistive head to differential inputs on the preamplifier 272. To minimize noise, the twisted pair head signal conductors 230 are routed along the metal suspension 276 as shown in FIG. 2.

Figure 5:
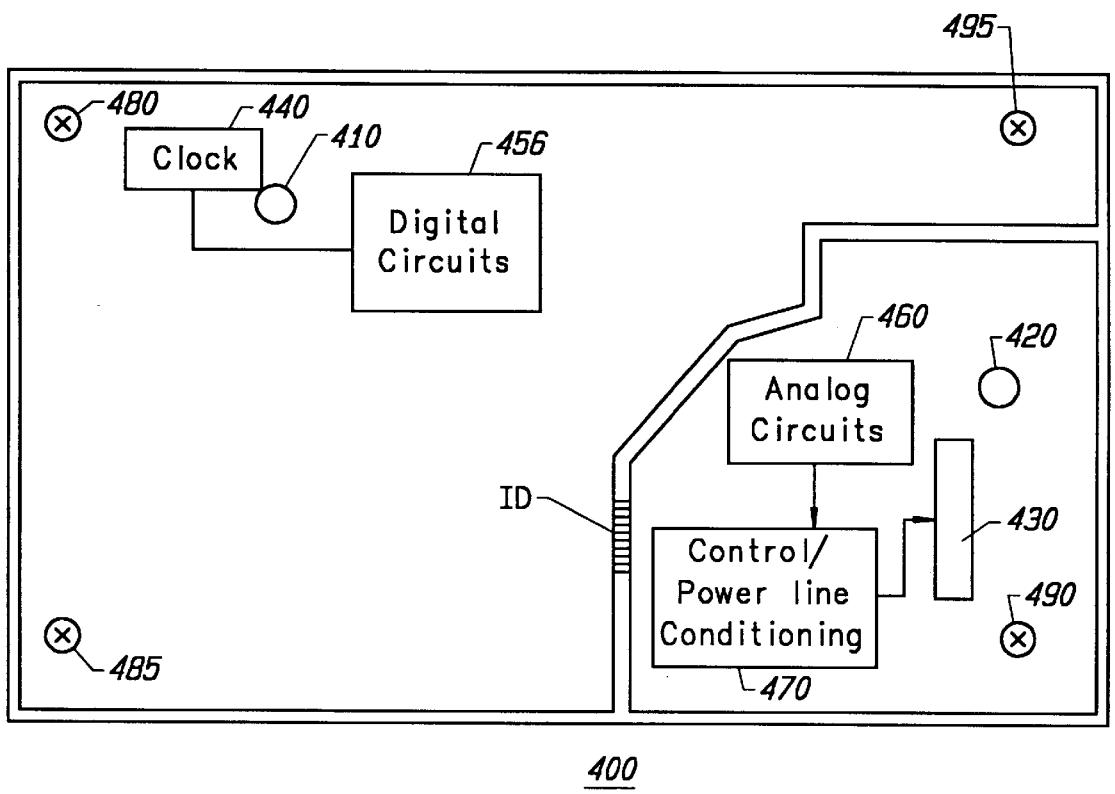
FIG. 5 illustrates one embodiment for a printed circuit board for use in a head-disk assembly that minimizes noise coupling.

The preamplifier 272 is electrically coupled to a control circuit mounted on a printed circuit board 400 (FIG. 5). For this embodiment, power and control conductors 270 conduct power and control signals to and from the preamplifier 272 and the control circuit on the printed circuit board. The entire head-disk assembly 200 is mounted on a base plate 278. In one embodiment, the head-disk assembly base plate 278 serves as a ground for the entire assembly; however, any metal ground in the hard disk drive storage device may be used without deviating from the spirit and scope of the invention.

The method and apparatus of the present invention utilize the discovery of two inductive loops on the head-disk drive assembly. In general, the first inductive loop acts as a shunt path for high frequency noise. Generally, and as described above, noise primarily enters the flex circuit through ground, power and control conductors that electrically couple the head-disk assembly to the printed circuit board. Noise carried on these conductors is then coupled to the actuator metal via parasitic or decoupling capacitors. Thus, the actuator metal is noisy with respect to the head-disk assembly metal ground due to the two inductive loops.

As shown in the embodiment of FIG. 2, the ground on the preamplifier 272 is directly coupled, via a short conductor, to the ground screw 255. The ground screw 255 couples the preamplifier ground to the metal of the actuator 220 (e.g., actuator metal). A ground trace (ground trace 260 on FIG. 2) is used to couple the actuator metal to the head-disk assembly metal (e.g., baseplate 278). However, the actuator metal and the head-disk assembly metal are not at an equal potential. Accordingly, a first inductive loop is formed between the leads of the preamplifier on the actuator to ground due to the unequal potential between the actuator metal and the head-disk assembly metal. Thus, the ground trace on the flex circuit, which couples the preamplifier ground to the baseplate metal, forms a self inductance because of the significant loop area of the ground trace.

A second inductive loop, which couples noise onto the inputs of a preamplifier mounted on an actuator, is identified. In general, the second inductive loop, generated by the unequal potential between the actuator metal and the head-disk assembly metal, results in electromagnetic field coupling through a path including the actuator 220, magnetic disk media 210 and the head-disk assembly metal. In the actuator 220, electromagnetic noise is coupled onto the leads of the preamplifier 220 from the suspension 276 and the head slider body assembly 240, including the head (FIG. 2). The suspension 276, which is part of the second inductive loop, is not at an equal potential with the actuator 220 metal. In fact, the potential at one end of the suspension 276 is not equal to the potential at the opposite end because it is part of the inductive loop.

For purposes of analysis, the magnetic disk media 210 has a conductive substrate. The second inductive loop path also includes coupling between the head-slider body assembly 240 and the conductive substrate on the magnetic disk media 210. The capacitance, measured between the head-slider body assembly 240 and the conductive substrate on the magnetic disk media 210, is high due to the small physical spacing between the head and the magnetic disk media 210. The second inductive loop path further includes coupling between the conductive substrate on the magnetic disk media 210 and the disk bearing assembly 280. Specifically, the disk bearing assembly 280 is conductively coupled to the conductive substrates of the magnetic disk media 210. Finally, the second inductive loop path includes electromagnetic coupling between the disk bearing assembly 280 and the head-disk assembly metal. Accordingly, there is a significant loop area consisting of the path including the actuator, 220 the suspension 276, the slider body assembly and heads 240, the magnetic disk media 210, the disk bearing assembly 280, and the head-disk assembly metal (e.g., base plate 278).

The second inductive loop allows coupling of a common mode signal into the twisted pair head signal conductors 230 of the magnetoresistive head inputs. In one embodiment, this common mode signal is converted to a single ended signal as a result of the poor common mode rejection of a typical magnetoresistive preamplifier. Alternatively, if a single ended preamplifier is used, the common mode signal is directly converted to a differential signal. The resulting differential signal causes a degradation in readwrite performance in the hard disk drive. Consequently, the self inductances of the first inductive loop, which includes the area between the ground trace on the flex circuit and the head-disk assembly metal, and the second inductive loop results in the introduction of a significant amount of high frequency noise on the preamplifier leads relative to the head-disk assembly metal.

In one embodiment, the second inductive loop is minimized by minimizing the size of the magnetic disk media. If the diameter of the magnetic disk media is reduced, then the actuator length is reduced, thereby minimizing noise coupling.

Figure 4:
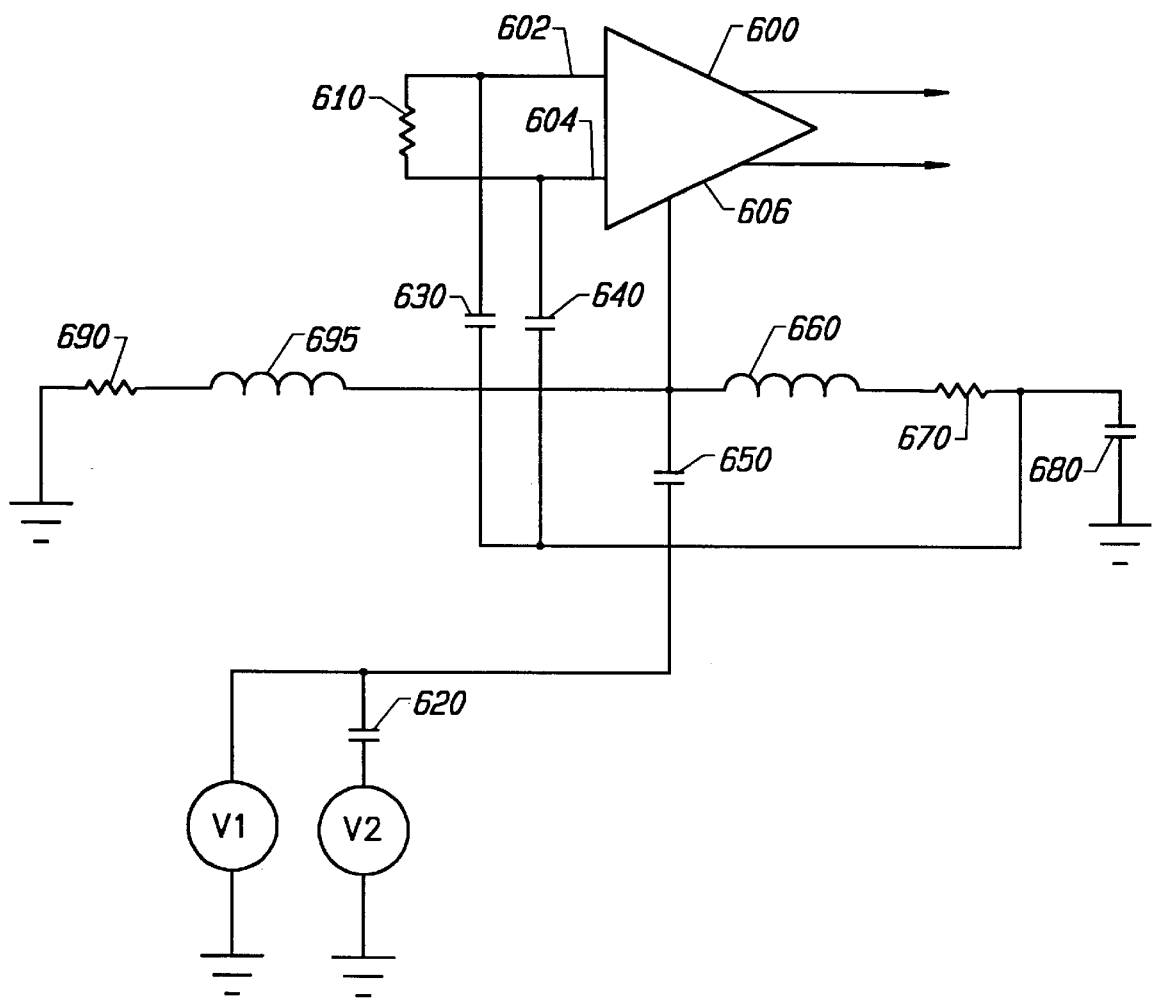
FIG. 4 is a schematic diagram illustrating the electrical characteristics in a typical head-disk assembly as a result of inductive loops.

FIG. 4 is a schematic diagram illustrating the electrical characteristics in a typical head-disk assembly as a result of the first and second inductive loops. The schematic of FIG. 4 includes a diagrammatic symbol for an amplifier, labeled 600. The magnetoresistive head is electrically represented by a resistor 610 (i.e., magnetoresistive heads exhibit low capacitance and inductance components). For this embodiment, the preamplifier 600 generates an amplified differential signal, designated by arrows and lines, based on the differential voltage generated by the magnetoresistive head.

FIG. 4 models the characteristics as a result of the first inductive loop. The ground symbols on the schematic represent the head-disk assembly metal ground. Specifically, FIG. 4 models the electrical characteristics of the ground, power and control conductors from the control circuit on the printed circuit board relative to the actuator 220 that result in coupling of electromagnetic noise into the preamplifier differential inputs 602 and 604. The electrical model includes a first voltage, labeled "V1", that represents electromagnetic noise coupled directly on the control, power, or ground conductors. The voltage V1, measured at the source of the control, power, or ground conductors, is relative to the head-disk assembly ground. A second voltage, labeled "V2", represents the noise on the printed circuit board ground and or printed circuit board power planes that have mutual capacitance to other head-disk assembly traces on the printed circuit board. As discussed above and shown in FIGS. 2 and 4, the control, power, and ground conductors are fed into the actuator 220. The control, power, and ground conductors connect either directly to the actuator metal (e.g., through the actuator screw 255), or the conductors connect capacitively through the leadsubstrate capacitance on the preamplifier 600. The power conductors connect to the actuator metal through large decoupling capacitors located on the actuator near the preamplifier. The ground plane to controlpower conductor capacitance, in the range of several pico farads (pF), is diagrammatically illustrated as capacitor 620 on FIG. 4. The control power conductor capacitance to the actuator, represented as capacitor 650, is approximately 15–25 pico farads (pF) for the control conductors, and approximately 0.1 micro farad ($\mu$F) for the power conductors. The ground trace 260 inductanceresistance on the flex circuit 250 (FIG. 2) is electrically modeled by inductor 695 and resistor 690, respectively.

The second inductive loop (actuator to head-disk assembly metal via magnetic disk media) is also electrically modeled in the schematic of FIG. 4. The actuator/suspension capacitance to the head wires, induced on the differential inputs 602 and 604 of preamplifier 600, are shown as capacitors 630 and 640. Each capacitor is typically in the range of 3–5 pico farads (pF). The inductance and resistance of the actuator suspension is diagrammatically represented with inductor 660 and resistor 670 on FIG. 4. The control/power conductors are input to the preamplifier 600 at input 606. The magnetoresistive head to magnetic media capacitance, also part of the second inductive loop, is shown as capacitor 680. The magnetoresistive head/magnetic media capacitance is in the range between 100–300 pico farads (pF).

Referring again to FIGS. 2 and 3, one embodiment for reducing noise coupling on an actuator of a head-disk assembly is illustrated. The first inductive loop area, consisting of the path between the ground trace 260 to the head-disk assembly baseplate 278, is significantly reduced. The smaller area of the first inductive loop reduces the self inductance, and consequently reduces the coupling of high frequency noise on the actuator 220. For the embodiment shown in FIGS. 2 and 3, a head-disk assembly ground conductor 265 couples the ground trace 260 to the head-disk assembly baseplate 278 as shown in the side view of FIG. 2. The control and power traces 270 are routed to the printed circuit board 400 via a separate longer path.

Figure 1A:
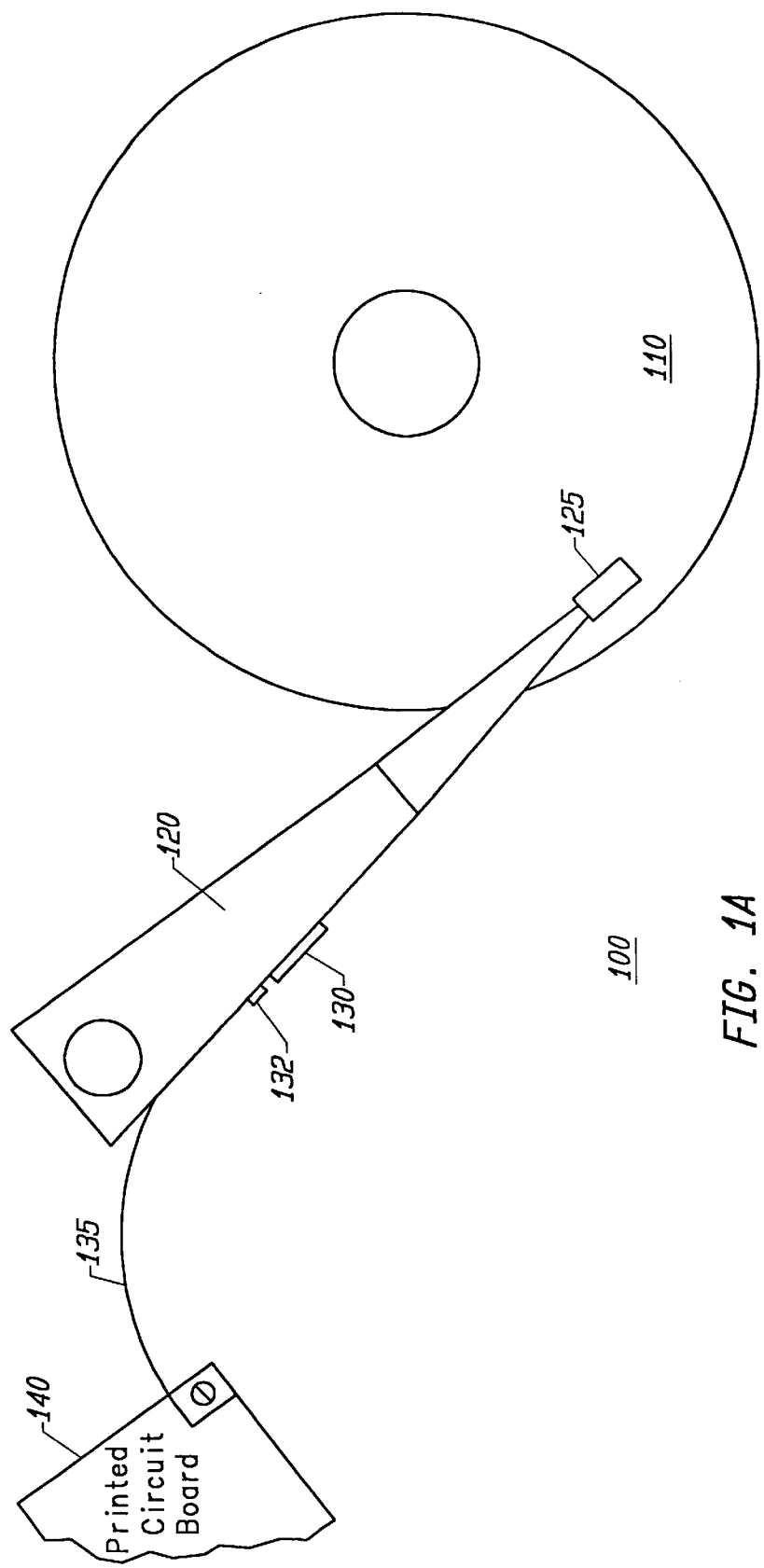
FIG. 1a is a top view of a prior art head-disk assembly.
Figure 1B:
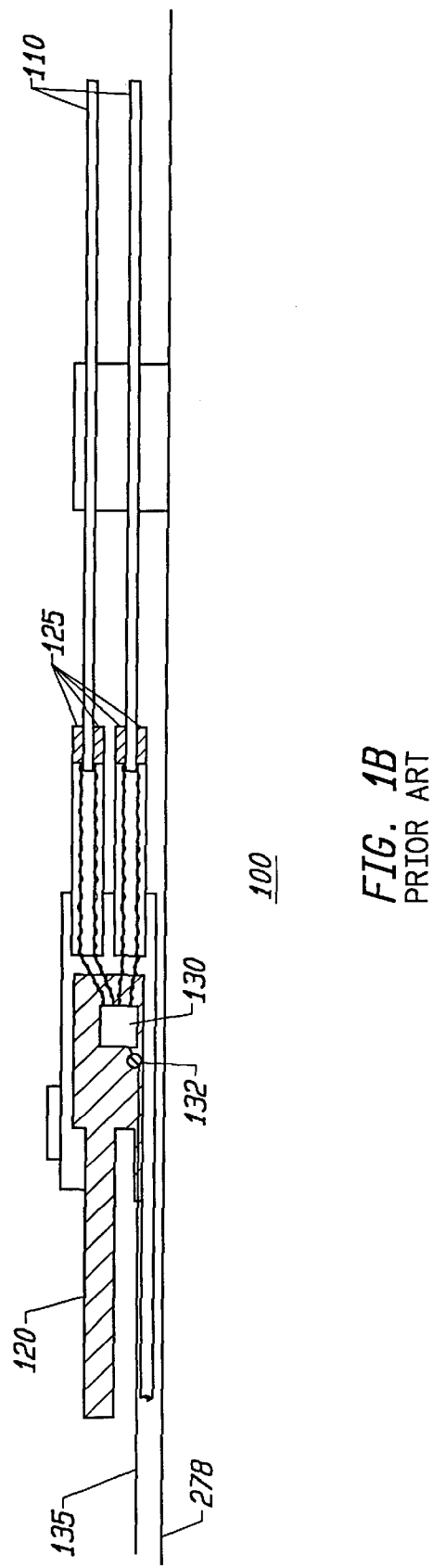
FIG. 1b is a side view of a prior art head-disk assembly.

The top view of the head-disk assembly 200 shown in FIG. 3 illustrates the short path of the ground trace 260 that couples the actuator metal ground conductor 255 to the head-disk assembly baseplate 278. For this embodiment, the ground trace 260 is the only ground return from the preamplifier 272 and actuator screw 255. Note that the actuator, which moves to read different tracks of the magnetic disk media 210, requires slack for the full range of movement of the actuator 220. The length of the ground trace 260 is minimized, but accommodates the full motion of the actuator 220. As can be seen by comparison between FIG. 1a and 3, the length of the ground trace 260 in FIG. 3 has been reduced significantly from the length of the conductors 135 shown in FIG. 1a.

In one embodiment, the head-disk assembly ground conductor 265 comprises a bracket coupling the ground trace 260 directly to the head-disk assembly baseplate 278 (e.g., the head-disk assembly metal). The short ground trace 260 also minimizes the potential difference between the actuator 220 suspension 276 and baseplate 278. Essentially, the potential difference between the actuator 220 metal and the head-disk assembly 200 metal is minimized, thereby minimizing the noise in the second inductive loop.

FIG. 5 illustrates one embodiment for a printed circuit board for use in a head-disk assembly that minimizes noise coupling. A printed circuit board 400 includes multiple layers including a power plane, ground planes, and signal paths. In general, the printed circuit board includes, for operation of the hard-disk drive, digital circuits 456, clock 440, analog circuits 460, and control/power and line conditioning 470. A head-disk assembly (HDA) connector 430 connects power and control conductors from the printed circuit for routing to the head-disk assembly 200.

For this embodiment, the ground plane is divided between a digital circuit ground plane 410 and an analog circuit ground plane 420. As is well known in the art of circuit board design, to minimize noise in printed circuit boards that integrate digital and analog circuits, the digital ground plane is isolated from the analog ground plane, and the ground planes are connected at a single point. For the embodiment illustrated in FIG. 5, the isolation of the digital circuit ground plane 410 and analog circuit ground plane 420 is done to try to eliminate any large ground currents that flow through the analog area near the head-disk assembly connector 430. The primary cause of noise on power and ground planes is due to the difficulty of maintaining an equal potential surface on the ground and power planes on the printed circuit board 400. The unequal potential between the power and ground planes results in an unequal potential between the PCB ground plane and the HDA metal ground.

A clock 440, used to generate data rates to read and write data in the hard-disk drive, is mounted on the printed circuit board 400 and coupled to the digital circuit ground plane 410. Similarly, digital circuits 450 that control the operation of the hard disk drive are also mounted on the printed circuit board and grounded on the digital circuit ground plane 410. Analog circuits 460, which operate on analog signals read from the head-disk assembly, are mounted on the printed circuit board 400, and are coupled to the analog circuit ground plane 420. The power and control signals from the analog circuits 460 are input to control/power line conditioning circuits 470. In general, the control/power line conditioning circuits 470 condition the power and control signals to reduce noise coupling in the actuator 220. The conditioned signals are then passed to the head-disk assembly (HDA) connector 430.

In order to maintain an equal potential between the PCB ground and the HDA metal ground, a conductive screw 490 is inserted into the head-disk assembly metal to attach the ground for the head-disk assembly to the PCB analog ground. For this embodiment, digital ground is attached to the head-disk assembly and PCB 400 either/and through conductive screws 480 and 485. Conductive screw 495 is not attached to the ground plane of the PCB 400, thus forming less of an inductive loop between the HDA metal and the PCB ground planes.

Figure 6A:
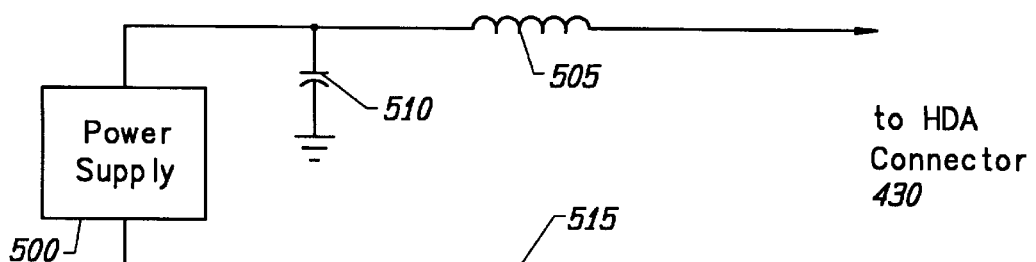
FIG. 6a illustrates one embodiment for conditioning power signals for the preamplifier on the actuator.
Figure 6B:
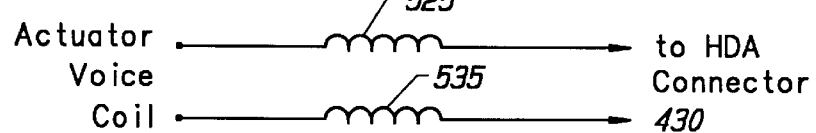
FIG. 6b illustrates one embodiment for conditioning the actuator voice coil lines with inductors.

FIGS. 6a–6e illustrate embodiments for the control/power line conditioning circuits 470. FIG. 6a illustrates one embodiment for conditioning power signals for the preamplifier on the actuator. The outputs of a power supply 500 are input to series inductors 505 and 515. The series inductors 505 and 515 present a high impedance from the power supply 500 in relationship to the actuator 220. Decoupling capacitors 510 and 520 are coupled only on the power supply side of the series inductors 505 and 515. (i.e., decoupling capacitors are used near the power inputs at the preamplifier 272). FIG. 6b illustrates one embodiment for conditioning the actuator voice coil lines with inductors 525 and 535, one inductor for each line. The voice coil line requires a series inductance to reduce potentially a significant capacitance from the coil to the actuator metal. As discussed above, this capacitance allows high frequencies to couple onto the actuator.

Figure 6C:
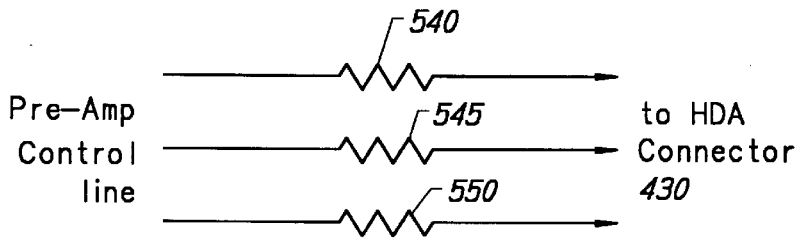
FIG. 6c illustrates a first embodiment for conditioning control lines from a printed circuit board to a head-disk assembly.
Figure 6D:
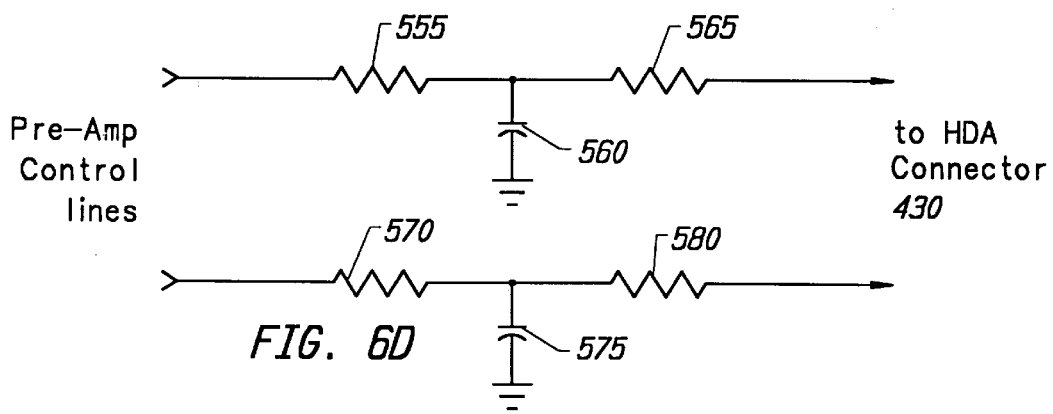
FIG. 6d illustrates a second embodiment for conditioning preamplifier control lines.
Figure 6E:
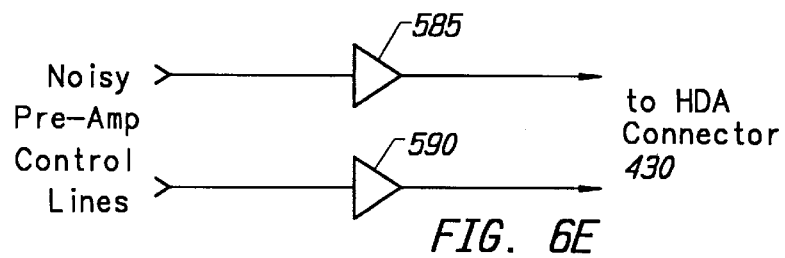
FIG. 6e illustrates a third embodiment for conditioning preamplifier control lines.

FIG. 6c illustrates a first embodiment for conditioning control lines from the printed circuit board 400 to the head-disk assembly 200. Series resistors, 540, 545 and 550, are used to condition the preamplifier control lines if the control lines are relatively quiet (i.e., free of noise). For noisy preamplifier control lines, two other embodiments provide additional filtering and conditioning. FIG. 6d illustrates a second embodiment for conditioning preamplifier control lines. Specifically, a resistor-capacitor-resistor network 555, 560, 565 and 570, 575, 580 effectively filters noisy preamplifier control lines. The R-C-R network improves filtering by providing a two pole roll-off of twelve decibels (dB) per octave. FIG. 6e illustrates a second embodiment for conditioning noisy preamplifier control lines. Each control line is conditioned with an active buffer, shown as buffers 585 and 590. The active buffer may be any type of current buffer, such as a standard transistor to transistor logic (TTL) compatible current buffer (e.g., an octal 74HC244 buffer) as long as power and ground are kept relatively free of noise.

Although the present invention has been described in terms of specific exemplary embodiments, it will be appreciated that various modifications and alterations might be made by those skilled in the art without departing from the spirit and scope of the invention.

What is claimed is:

1. A head-disk assembly, comprising:
   a baseplate;
   an actuator, comprising;
      a magnetoresistive head;
      a flex circuit comprising a pre-amplifier electrically coupled to the magnetoresistive head;
      an actuator body which houses the magnetoresistive head and the flex circuit and which is electrically grounded to the pre-amplifier; and
      a first minimizing means for minimizing an area of a first inductive loop arising from conduction between the actuator body and the baseplate, by configuring an area of the first inductive loop to be less than an area encompassed by the actuator arm and at least an equivalent portion of the baseplate.

2. The head-disk assembly as set forth in claim 1, wherein the first minimizing means comprises a ground conductor coupling the actuator body, the baseplate, and ground on the pre-amplifier so as to minimize the area of the first inductive loop.

3. The head-disk assembly as set forth in claim 2, further comprising:
   a control circuit configured to process control signals to control the pre-amplifier and configured to supply power to the pre-amplifier, a ground for the control circuit being electrically coupled to the baseplate; and
   coupling means for electrically coupling the power and control signals from the control circuit to the preamplifier through a path independent from the ground conductor.

4. The head-disk assembly as set forth in claim 3, wherein the ground for the control circuit is electrically coupled to the baseplate at a point where the ground conductor is coupled to the baseplate.

5. The head-disk assembly as set forth in claim 3, wherein the coupling means comprises an inductance reducing means for reducing inductance of the power signal.

6. The head-disk assembly as set forth in claim 3, wherein the coupling means comprises actuator voice coil conductors, and further comprises a series inductor on the actuator voice coil conductors.

7. The head-disk assembly as set forth in claim 3, wherein the coupling means comprises pre-amplifier control lines, and further comprises series resistors coupling the preamplifier control lines on the control circuit to the head-disk assembly.

8. The head-disk assembly as set forth in claim 3, wherein the coupling means comprises pre-amplifier control lines, and further comprises a resistor-capacitor-resistor (RCR) network coupling, in series, the pre-amplifier control lines on the control circuit to the head-disk assembly.

9. The head-disk assembly as set forth in claim 3, wherein:
   the control circuit is disposed on a printed circuit board; and the coupling means comprises pre-amplifier control lines, and further comprises a buffer coupling, in series, the pre-amplifier control lines on the printed circuit board to the head-disk assembly.

10. The head-disk assembly as set forth in claim 2, wherein a length of the ground is minimized to only provide enough slack for full motion of the actuator.

11. The head-disk assembly as set forth in claim 1, further comprising:

a head signal conductor for electrically coupling inputs on the pre-amplifier with the magnetoresistive head;

a suspension and a slider body assembly for mounting the magnetoresistive head;

at least one magnetic disk media with a conductive substrate; and a second minimizing means for minimizing an area of a second inductive loop arising from an unequal potential from a conductive path including the pre-amplifier, the head signal conductor, the suspension, the slider body assembly, the magnetoresistive head, the magnetic disk media, and the baseplate, such that the area of the second inductive loop is configured to minimize noise coupling onto the actuator body and into the pre-amplifier.

12. The head-disk assembly as set forth in claim 11, further comprising:

a control circuit configured to process control signals between the control circuit and the pre-amplifier and configured to provide power singals to the pre-amplifier, comprising, a printed circuit board with isolated analog and digital ground planes, the control and power signals received in an area of the printed circuit board comprising the analog ground plane; and a clock circuit housed in an area of the printed circuit board comprising the digital ground plane.

13. A head-disk assembly comprising:

a baseplate;

an actuator comprising:
 a magnetoresistive head;
 a flex circuit comprising a pre-amplifier electrically coupled to the magnetoresistive head;
 an actuator for housing the magnetoresistive head and the flex circuit;
 a ground trace electrically coupling ground on the pre-amplifier circuit;
 an actuator conductor electrically coupling the actuator to the ground trace; and a ground conductor electrically coupling the ground trace at the actuator conductor to a head-disk assembly ground on the baseplate so that an inductive loop area, which arises from the distance between the actuator conductor and the baseplate, is configured to be less than an area encompassed by the actuator and an equivalent area of the baseplate, such that reduction of the inductive loop area reduces high frequency noise coupling onto the actuator.

14. The head-disk assembly as set forth in claim 13, further comprising:

a control circuit, including a clocking circuit, for processing control signals for the pre-amplifier and for supplying power to the pre-amplifier, a ground for the control circuit being electrically coupled to the head-disk assembly ground; and power, signal, and control traces electrically coupling the pre-amplifier to the control circuit through a path independent from the ground trace coupling to the head-disk assembly ground.

15. The head-disk assembly as set forth in claim 14, wherein the control traces comprise pre-amplifier control lines, and further comprise series resistors coupling the pre-amplifier control lines from the control circuit to the head-disk assembly.

16. The head-disk assembly as set forth in claim 14, wherein the control traces comprise pre-amplifier control lines, and further comprise a resistor-capacitor-resistor (RCR) network coupling, in series, the pre-amplifier control lines on a printed circuit board of the control circuit to the head-disk assembly.

17. The head-disk assembly as set forth in claim 14, wherein;

the control circuit is disposed on a printed circuit board; and the control traces comprise pre-amplifier control lines, and further comprise a buffer coupling, in series, the pre-amplifier control lines on the printed circuit board to the head-disk assembly.

18. The head-disk assembly as set forth in claim 14, wherein:

the control circuit comprises a printed circuit board with isolated analog and digital ground planes;

the clocking circuit is housed in an area of the printed circuit board comprising the digital ground plane;

and the control and power traces are connected to an area of printed circuit board comprising the analog ground plane.

19. The head-disk assembly as set forth in claim 14, wherein the power traces comprise series inductors from the control circuit to the head-disk assembly.

20. The head-disk assembly as set forth in claim 14, wherein the control traces comprise actuator voice coil conductors on a printed circuit board of the control circuit and further comprise series inductors coupling the actuator voice coil conductors to the head-disk assembly.

* * * * *